June 21, 1955 C. LILIENTHAL 2,711,348
SPRAYERS FOR LIQUIDS
Filed Dec. 11, 1953

INVENTOR.
CONSTANTINO LILIENTHAL
BY
Linton and Linton
ATTORNEYS

United States Patent Office 2,711,348
Patented June 21, 1955

2,711,348

SPRAYERS FOR LIQUIDS

Constantino Lilienthal, Montevideo, Uruguay

Application December 11, 1953, Serial No. 443,887

2 Claims. (Cl. 299—88)

This invention relates to improvements in sprayers for liquids of the type which comprises an air pump and a receptacle for the liquid, the air pump causing air under pressure to be delivered through a suitable nozzle situated in close proximity and at a suitable angle to a second nozzle of a pipe communicating with the receptacle for the liquid. The rush of air past the end of the second nozzle causes an amount of liquid to be delivered through it and to be sprayed by the current of air.

My invention relates to some useful improvements I have made in the sprayer device patented under No. 2,637,596.

One object of the invention is to provide a construction simpler and cheaper than that disclosed in said patent.

Another object of my invention is to provide a sprayer more effective than the aforesaid patented device, although it comprises a lower number of parts. The cylindrical casing that contains the pump casing has been suppressed. A cylindrical container for the liquid has been coaxially provided at one end of the pump casing. The cylindrical container is devised in such a way that the parts forming the chamber for the liquid and the semicircular wall may be assembled very easily.

The improved sprayer to which this invention relates, substantially consists of a cylindrical pump casing with a piston slidably mounted thereinto, a plug for one end of said casing having an opening therethrough a rod connected at one end to said piston and slidably extending through said plug opening, a cylindrical container coaxial to the pump casing and having a rear closing wall provided with an opening and closing also the other end of the pump casing, a cap mounted on the end of the cylindrical container opposite to the rear wall and closing the said container, a chamber for liquid formed in said cap and protruding from its exterior side, a semicircular partition extending laterally within said container and across the lower half of same adjacent said cap, an inlet tube extending into the upper interior portion of said chamber and into the lower portion of the space comprised between the said partition and the said cap, and an outlet tube extending from the lower interior portion of said chamber outwardly with its open end beneath the open end of a tube connected to the opening in the rear wall of the container and extending through said container.

Figure 1:
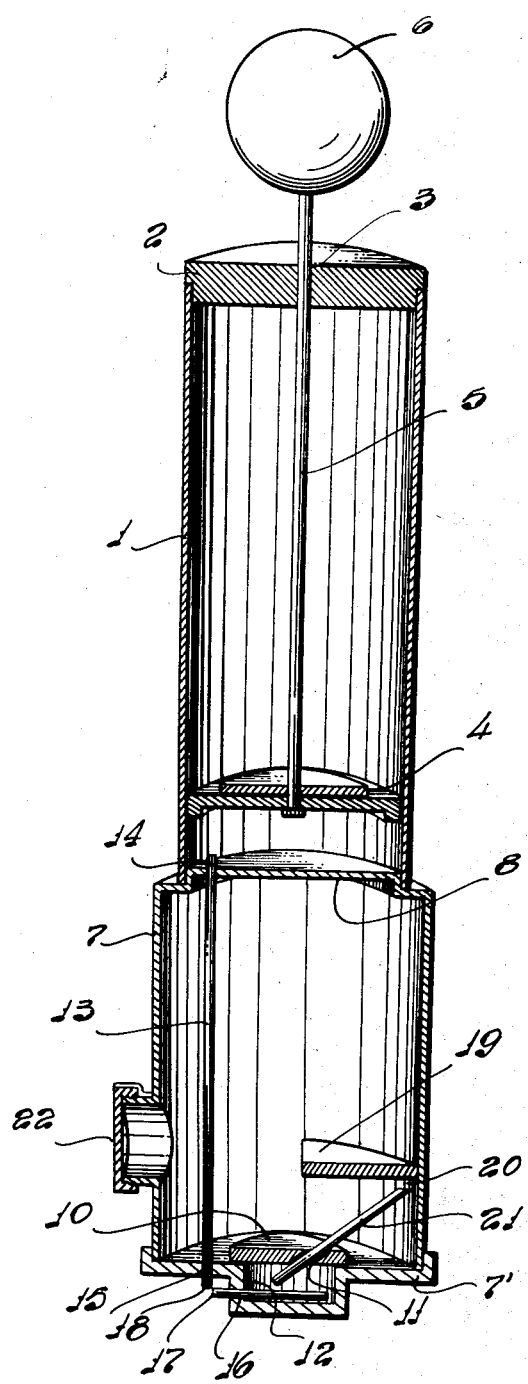
Figure 2:
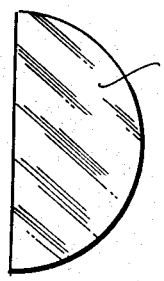
Figure 3:
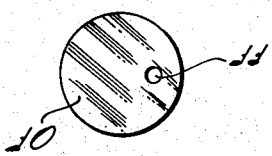

A preferred embodiment of the invention is shown in the accompanying drawing, where Fig. 1 is a vertical longitudinal section of my improved sprayer; Fig. 2 is a plan view of the semicircular partion; and Fig. 3 is plan view of a circular wall closing the chamber for the liquid formed in the cap closing the container for the liquid.

As it will be seen in these drawings, the improved sprayer comprises a cylindrical pump casing 1 closed at one end by a plug 2 having an opening 3. A piston 4 is slidably mounted within said cylindrical casing 1 and is connected to a rod 5 extending through opening 3 and provided with a handle 6. A cylindrical container 7 for the liquid to be sprayed is axially placed at the other end of the cylindrical casing 1 and wall 8 of the former closes the said casing end. Container 7 is closed by a cap 7', which has a protruding cylindrical part 9 extending outwardly. Said protruding part 9 is closed interiorly by a circular wall 10 having an opening 11 (see Fig. 2). Part 9 and wall 10 form together a chamber 12 for the liquid. Wall 8 has an opening 14 and cap 7' has another opening 15 through which passes a tube 13 connected to opening 14. An outlet tube 16 extends from the lower interior portion of chamber 12 outwardly with its open end 17 beneath the open end 18 of tube 13. A semicircular partion wall 19 extends laterally across the lower half of container 7 adjacent to cap 8 forming a space 20 to trap liquid, that may enter it by passing above the superior edge of partition wall 19. An inlet tube 21 extends from the lower portion of space 20 into the interior upper portion of chamber 12. Furthermore a suitable opening, provided with a cap 22, has been provided to fill container 7 with the liquid to be sprayed.

As it will be seen in the accompanying drawings, liquid contained in container 7 may flow over partition 19, filling space 20. When the liquid level is below the superior edge of partition 19, the liquid may be caused to flow over that edge, simply by inclining the sprayer. The said partition will act as a trap for the liquid, so that when the sprayer points obliquely upwards, some amount of liquid will be retained in space 20. By pumping air through air tube 13, a depression will occur in chamber 12, and consequently liquid in space 20 will be caused to flow into chamber 12 through inlet tube 21. When chamber 12 is filled with liquid it will be possible to spray it with the sprayer in a vertical position. The liquid in chamber 12 will flow through outlet tube 16; and the output of liquid through this tube will maintain the depression in the chamber and will provoke a new provision of liquid in said chamber. As it will be seen the sprayer may spray in any position it is given by the operator.

The improved sprayer may be manufactured in a very easy and simple way: Container 7 may be built by stamping a metallic plate. Partition 19 may be secured by soldering. Cap 8 may be also obtained by stamping a metal plate; then outlet pipe 16 may be fixed in position and plate 10 may be soldered so as to close the chamber once inlet tube has been fixed to it. Air tube 13 may be positioned before closing the container with completed cap 8.

Having now described my invention, what I claim as new, and desire to secure by Letters Patent, is:

1. A manually operated sprayer for liquids comprising a cylindrical pump casing with a piston slidably mounted thereinto, a plug for one end of said casing having an opening therethrough, a rod, provided at one end with a handle, connected at the other end to said piston and slidably extending through said plug opening, a cylindrical container coaxial to the pump casing and having a rear closing wall provided with an opening the said rear wall closing also the end of the pump casing, a cap closing the end of the said container opposite to that closed by the rear wall, a chamber for liquid formed in the said wall and protruding from the exterior side of said cap, a semicircular partition wall extending across the lower interior portion of the said container adjacent said cap, an air tube connected to the opening in the rear wall of the container and extending through said container and the said cap, an inlet tube extending into the upper interior portion of said chamber for liquid and into the lower portion of the space comprised between the said partition wall and the said cap, an outlet tube extending from the lower interior portion of said chamber for liquid outwardly with its open end beneath the open end of said air tube, and an opening provided with a cap in the upper part of the container to fill it with liquid.

2. A manually operated sprayer for liquid according to claim 1, where the chamber for liquid in the said cap is formed by a circular recess stamped in the central portion of said cap, and a circular wall closing the recess.

References Cited in the file of this patent

UNITED STATES PATENTS

| | | |
|---|---|---|
| 616,989 | Tabor | Jan. 3, 1899 |
| 2,339,426 | Root | Jan. 18, 1944 |
| 2,436,478 | Lindquist | Feb. 24, 1948 |